(12) United States Patent
Kussmaul et al.

(10) Patent No.: US 12,174,899 B2
(45) Date of Patent: Dec. 24, 2024

(54) GEOFENCING QUERIES BASED ON QUERY INTENT AND RESULT SEMANTICS

(71) Applicant: International Business Machines Corporation, Armonk, NY (US)

(72) Inventors: Timo Kussmaul, Boeblingen (DE); Uwe Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/559,706

(22) Filed: Sep. 4, 2019

(65) Prior Publication Data

US 2021/0064658 A1 Mar. 4, 2021

(51) Int. Cl.
*G06F 16/909* (2019.01)
*G06F 16/29* (2019.01)
*G06F 16/951* (2019.01)
*G06N 3/04* (2023.01)

(52) U.S. Cl.
CPC ............ *G06F 16/909* (2019.01); *G06F 16/29* (2019.01); *G06F 16/951* (2019.01); *G06N 3/04* (2013.01)

(58) Field of Classification Search
None
See application file for complete search history.

(56) References Cited

U.S. PATENT DOCUMENTS

| | | |
|---|---|---|
| 9,141,656 B1 | 9/2015 | Lopyrev et al. |
| 9,177,061 B2 | 11/2015 | Bennett |
| 10,102,256 B2 | 10/2018 | Barron et al. |
| 2003/0200299 A1* | 10/2003 | Jamison, III ............... H04L 9/40 709/223 |
| 2009/0106207 A1 | 4/2009 | Solheim et al. |
| 2014/0236644 A1* | 8/2014 | Abhyanker ............ G06Q 30/02 705/5 |
| 2015/0234920 A1* | 8/2015 | Tawfik ................ G06F 16/9535 707/724 |
| 2015/0373030 A1* | 12/2015 | Bank ..................... H04W 4/025 455/411 |
| 2016/0004862 A1* | 1/2016 | Almehmadi ........ G06F 21/6218 726/25 |

(Continued)

OTHER PUBLICATIONS

Mell et al., The NIST Definition of Cloud Computing, Recommendations of the National Institute of Standards and Technology, Special Publication 800-145, Sep. 2011, 7 pages.

*Primary Examiner* — Hosain T Alam
*Assistant Examiner* — Soheila (Gina) Davanlou
(74) *Attorney, Agent, or Firm* — Daniel M. Yeates

(57) ABSTRACT

A computer implemented method and related system control access to data based on query intent and result semantics in a cognitive search system, the method including receiving a query from a user at a location, wherein the query is configured to identify a set of results. The method also includes, identifying the location and validating the user is authorized to access one or more indexes. The method includes, determining an intent of the query, wherein the intent predicts how the user will use the set of results. The method includes, establishing a first intent geofence, wherein the intent geofence defines a first geographic area. The method includes obtaining a plurality of results from a first index, determining the location of the user is within the first intent geofence, and returning the plurality of results to the user.

20 Claims, 6 Drawing Sheets

(56) References Cited

U.S. PATENT DOCUMENTS

| | | |
|---|---|---|
| 2016/0028732 A1 | 1/2016 | Fox et al. |
| 2016/0142895 A1* | 5/2016 | Bennett ................ H04W 76/50 |
| | | 455/404.1 |
| 2016/0146623 A1* | 5/2016 | Ren .................... G01C 21/3682 |
| | | 701/400 |
| 2016/0188565 A1* | 6/2016 | Robichaud ............. G06F 40/35 |
| | | 704/9 |
| 2016/0246980 A1* | 8/2016 | Toillon .................. G06F 21/604 |
| 2017/0103080 A1* | 4/2017 | Quong ................ G06F 16/2455 |
| 2017/0126698 A1* | 5/2017 | Minkovich ............. G06F 21/00 |
| 2018/0075327 A1* | 3/2018 | Rubinton ............. H04W 4/021 |
| 2018/0232450 A1* | 8/2018 | Bivens .................. G06F 16/93 |
| 2018/0232767 A1* | 8/2018 | Garg ................. G06Q 30/0261 |
| 2019/0057587 A1* | 2/2019 | Jones .................... H04W 4/021 |
| 2020/0034357 A1* | 1/2020 | Panuganty ............ G06F 16/248 |

\* cited by examiner

GEOFENCING QUERIES BASED ON QUERY INTENT AND RESULT SEMANTICS

BACKGROUND

The present disclosure relates to search services, and, more specifically, to geofencing queries based on query intent and result semantics.

Access control to search queries and search results are generally controlled by simple yes or no access controls. In some advanced cases there are group and/or individual access controls based on the ownership of a document or data repository.

SUMMARY

Disclosed is a computer implemented method to control access to data based on query intent and result semantics in a cognitive search system, the method including receiving a query from a user at a location, wherein the query is configured to identify a set of results. The method also includes, identifying the location. The method further includes validating the user is authorized to access one or more indexes. The method including, determining an intent of the query, wherein the intent predicts how the user will use the set of results. The method also includes, establishing, in response to determining the intent, a first intent geofence, wherein the intent geofence defines a first geographic area. The method further includes obtaining a plurality of results from a first index. The method including, determining the location of the user is within the first intent geofence, and returning, in response to determining the location of the user is within the first intent geofence, the plurality of results to the user. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the Specification. They illustrate embodiments of the present disclosure and, along with the description, serve to explain the principles of the disclosure. The drawings are only illustrative of certain embodiments and do not limit the disclosure.

Figure 1:
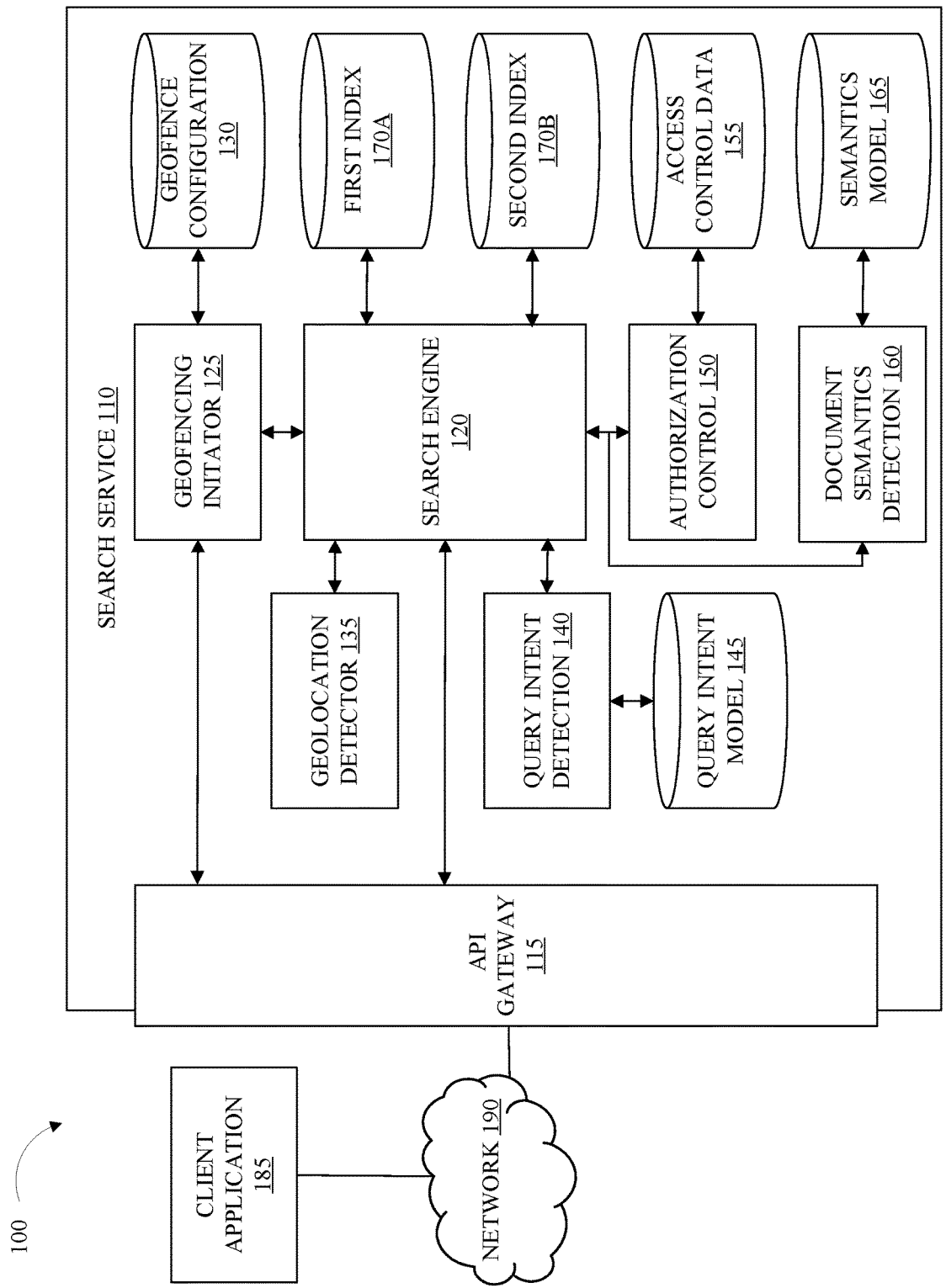
FIG. 1 illustrates a functional block diagram of a computing environment suitable for operation of a search service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to search services, and, more specifically, to geofencing queries based on query intent and result semantics. Aspects of the present disclosure may be better appreciated in light of the aforementioned applications.

Access control to search queries and search results are generally controlled by simple yes or no access controls. In some advanced cases there are group and/or individual access controls based on the ownership of a document or data repository.

There is an ever-increasing focus on data storage, management, sharing, and/or distribution, especially data related to consumers (e.g., personally identifiable information). New laws and regulations, such as the Global Data Protection Regulation (GDPR) of the European Union, place limits on data handlers and data processors use data. The regulations may cover storing, transferring, deleting, sharing, viewing, accessing, and more. Organizations that violate the regulation can be subject to large monetary fines and other sanctions.

Embodiments of the current disclosure describe embodiments of a cognitive search service configured to provide access control, security, and privacy controls for data. For purposes of this documents, data access, access control, data security, and data privacy may be used interchangeably.

In some embodiments, the search service receives a query. In some embodiments, the query is received as part of an application programming interface (API) request. The query may be received from a client application. In some embodiments, the query includes a request for data. The request may include which indexes (e.g., data repository, storage system, etc.) to search, and what data to search for.

In some embodiments, access control is based on permissions. Each document and/or database may have an owner. The owner can allow or disallow specific users, or groups of users, from accessing the documents they own. In some embodiments, the permissions are based on each user having a unique identifier (e.g., username). The unique identifier may be processed by an authorization control to determine if that user may access those documents.

However, it is possible a user may violate a regulation when accessing data for which they have permissions. For example, a regulation may forbid transferring a specific document across an international boundary. A user may be travelling while downloading data to a personal computing device, and by doing so violate the regulation. Thus, embodiments of the present disclosure utilize one or more geofences to control access to data. A geofence is a virtual perimeter defined by a set of coordinates. Geofences may act as boundaries that allow/prohibit certain digital actions while inside/outside the boundary. For example, a company may store a trade secret in a facility server. A geofence could be set up around the facility that only allows access to trade secret data if the request originates from within the facility.

Any access request from outside the geofence boundary would be denied even if the requestor is authorized to access that data.

In some embodiments, geofences are used to control querying data. Continuing the above example, a geofence may be set up at the boundary of the user's home country, and forbid access while the user is outside that boundary. Alternatively, the geofence could be set up around the border of the country the user is visiting. Then the user could access the data while anywhere except that country. This allows the data owner to configure data access to any desired configuration.

In some embodiments, geofences are used to control results of the query. In some embodiments, the geofences may be based on result semantics. Result semantics can refer to the type of documents and/or specific language in the document. In some embodiments, results semantics may be grouped into types and/or categories. For example, some categories may be customer information, sensitive information, proprietary information, confidential information, and other similar categories. One document or part of a document may include multiple categories simultaneously. In some embodiments, various geofences are used for different result semantics. For example, customer information may have a first geofence, confidential information a second geofence, and data that falls under both categories a third geofence.

In some embodiments, the result semantics are identified by a machine learning model (e.g., artificial neural network, supervised/unsupervised learning model, machine learning algorithm, etc.). The learning model may be trained with training data.

In some embodiments, the access control is based on the query intent. Query intent indicates a purpose for a query. There may be a set of predefined intents. Each query may be associated to one of the intents. For example, the potential intents may be assistance, purchase, and knowledge. A query that says, "how do I fix my bike?" could be linked to assistance intent. This indicates the user is looking for assistance, and results that provide assistance may be prioritized. In some embodiments, the intent of queries may include: relating to data, view, manipulate, transfer, download, aggregate, and other similar intents. In some embodiments, the query intent is identified by a machine learning model.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100 that is capable of running a cognitive search service, search service 110, in accordance with one or more embodiments of the present disclosure. The components of computing environment 100 and/or search service 110 can include more or fewer modules than those depicted. Search service 110 can include modules and sub-modules in different locations than depicted. Additionally, any module may be a sub-module or a parent module to each of the other modules within search service 110. Any of the separate modules may be combined into a single module or separated into multiple modules. Many modifications to the depicted environment may be made by those skilled in the art without departing from the scope of the disclosure as recited by the claims.

Computing environment 100 includes search service 110, client application 185, and network 190.

Network 190 can be, for example, a telecommunications network, a local area network (LAN), a wide area network (WAN), such as the Internet, or a combination of the three, and can include wired, wireless, or fiber optic connections. Network 190 may include one or more wired and/or wireless networks that are capable of receiving and transmitting data, voice, and/or video signals, including multimedia signals that include voice, data, and video information. In general, network 190 may be any combination of connections and protocols that will support communications between search service 110, client application 185, and other computing devices (not shown) within computing environment 100.

Client application 185 can be run on any device configured to exchange data with search service 110. The data may include client application 185 sending queries and receiving results from search service 110. Client application 185 may be one or more programs configured to operate on a data processing system. The data processing systems may include client computing devices, server computing devices, a tablet computer, laptop computer, telephone or other communication device, a personal digital assistant (PDA), or the like. In some illustrative examples, the client application 185 may be run on a portable computing device that is configured with flash memory to provide non-volatile memory for storing operating system files and/or user-generated data, for example. Thus, the client application 185 may essentially be any known or later-developed data processing system without architectural limitation.

In some embodiments, client application 185 can determine the geographic location of the device on which it runs. The location may be determined by GPS, by IP address, cellular network, and/or any other method to identify a location.

Search service 110 can be a standalone computing device, a management server, a web server, a mobile computing device, or any other electronic device or computing system capable of receiving, sending, and processing data. In other embodiments, search service 110 can represent a server computing system utilizing multiple computers as a server system, such as in a cloud computing environment. In some embodiments, search service 110 represents a computing system utilizing clustered computers and components (e.g., database server computers, application server computers, etc.) that act as a single pool of seamless resources when accessed within computing environment 100.

In some embodiments, search service 110 provides access controls for data by geofencing queries based on query intent and result semantics. In some embodiments, search service 110 is configured to operate in a cloud environment. In some embodiments, search service 110 includes API gateway 115, search engine 120, geofence initiator 125, geofence configuration 130, geolocation detection 135, query intent detection 140, query intent model 145, authorization control 150, access control data 155, document semantic detector 160, semantics model 165, index 170A, and index 170B.

API gateway 115 can be any combination of hardware and/or software configured to interface between search service 110 and query requestor. In some embodiments, API gateway 115 allows client application 185 (e.g., smartphone applications, desktop applications, scripts execute in a web browser, etc.) to access search service 110. API gateway 115 may act as a firewall between search service 110 and network 190.

In some embodiments, API gateway receives API calls containing a query. The query may contain a set of query parameters which specify criteria for searching content item (e.g., search terms). The query may also include which indexes to search and/or how to organize any results. The gateway may then determine the query is valid and forward the query to other components of search service 110. API gateway 115 may also configure and return the results to the requestor.

Search engine 120 can be any combination of hardware and/or software configured to provide functionality for searching data. In some embodiments, the data is unstructured data. Unstructured data can be any data in any format (e.g., text, binary). In some embodiments, search engine can manage/search multiple indexes. Search engine 120 may execute a search within the bounds of the received query. In some embodiments, search engine 120 gathers and ranks the results.

Geofence initiator 125 can be any combination of hardware and/or software configured to establish and maintain geofences. In some embodiments, geofence initiator 125 identifies the relevant geofences. The relevant geofences may depend on the location of client application 185 device, the query intent, and or the semantics of the results. In some embodiments, geofence initiator 125 validates the query location is within all relevant geofences. Geofence initiator 125 may allow access to the data in response to the location being within one or more of the geofences. Alternatively, geofence initiator 125 may deny access to the data in response to the locations being outside one or more of the geofences.

Geofence configuration 130 can be a storage system configured to maintain configurations of the plurality geofences. Each geofence may include a configuration and be uniquely identified (e.g., geofence 1, geofence 2, etc.). Each geofence configuration is made up a set of geofence definitions in, e.g., a machine-readable representation.

In some embodiments, each geofence includes a boundary definition. The boundary definition can be any description that defines the geofenced area (geographic region). As example, the area may be a radius around a point location, a polygon (e.g., a square starting at a point with the first edge going north 1 mile), and/or a set of coordinates that represent a boundary. In some embodiments, a user (e.g., data owner) may draw (or otherwise mark) the area on a map. The system may then convert the drawing to a set of coordinates.

In some embodiments, each geofence includes at least one intent. The geofence may become active in response to determining, by a query intent learning model, the query intent matches one or more of the intents in the geofence. In some embodiments, each geofence includes at least one semantic class. The geofence may become active in response to determining the results of the query included one or more of the semantic classes associated with the geofence.

Geolocation detector 135 can be any combination of hardware and/or software configured to identify the originating location of the query. This location may be the location of client application 185 device, and/or the location of the user submitting the query. In some embodiments, the locations are identified by global positioning system (GPS), cellular signals, satellite signals, IP address, and other similar techniques.

Query intent detector 140 can be any combination of hardware and/or software configured to identify an intent associated with a query. In some embodiments, the intent represents (signifies, predicts) an intended use of the data. In some embodiments, the intent is chosen from a predefined set of intents. The set of intents may include administrator query, manager query, product search, product purchase, assistance, transfer, alter, view, and/or other categories. In some embodiments, the determined intent is based on the parameters of the query. In some embodiments, the determined intent is based on the user. For example, if the query is initiated by the data owner, the intent may be "administrator query." In some embodiments, the intent is determined by query intent model 145.

Query intent model 145 can be a storage system configured to store and maintain a learning model for identifying query intent. In some embodiments, the query intent model 145 includes a machine learning model. The model may be trained by a set of training data. The training data can include a set of queries and an intent associated with the queries. In some embodiments, search service 110 stores the results of each identified intent. In some embodiments, search service 110 requests feedback from the user. The feedback may include the query, a description of the intent determination, and a prompt asking the user if the determination is correct. In some embodiments, query intent model 145 is updated based on the saved results and/or based on user feedback. Learning models will be discussed in further detail in relation to FIG. 4.

Authorization control 150 can be any combination of hardware and/or software configured to verify a user is authorized to access data. In some embodiments, authorization control 150 includes one or more methods to authenticate a user. This may include usernames, passwords, keys, and/or other authentication methods. In some embodiments, authorization control 150 enables access to the data in response to affirmative authorization.

Access control data 155 can be one or more storage systems configured to store authorization data. In some embodiments, access control data 155 stores a username and associate verification key for each user. The verification key may be a multiple use key or a one-time key. In some embodiments, access control data 155 includes permissions and data owners. A data owner may select who and in what circumstances (e.g., which geofences apply to which conditions) for the data they own. The data owner may update who, how and where, the data they own may be viewed, used, and/or manipulated. Access control data 155 may be controlled based on groups (e.g., everyone with an email from a specific domain). Access to access control data 155 may be determined on an individual basis.

Document semantic detection 160 can be any combination of hardware and/or software configured to identify a semantic category in results of a query. In some embodiments, the semantic category is chosen from a set of predetermined categories. The categories can be narrow or broad and may include any way of identifying the query results. The set of semantic categories may include customer-information, product-information, advertisement, title, dates, and other categories. In some embodiments, the semantic categories may be applied to documents or parts of documents. In some embodiments, a single result may include multiple categories. In some embodiments, the result semantics are determined by semantics model 165.

Semantics model 165 can be any a storage system configured to store and maintain a learning model configured to identify result semantics. In some embodiments, semantics model 165 may be trained, updated, and seek feedback consistent with query intent model 145. However, the training data and feedback are related to document semantics rather than intent identification.

First index 170A and second index 170B can be any storage system configured to store any configuration of data. In some embodiments, search service 110 includes additional indexes other than first index 170A and second index 170B (which may be jointly referred to as the indexes 170). In some embodiments, the stored data on the indexes may be searchable by search engine 120. In some embodiments, each of the indexes have different access control. This may include different data owners, different permissions, different geofences, etc. For example, data that comes out of the first index may be accessed if the user's location falls within a first geofence, while data from the second index may only be accessed if the user's location is within a second geofence. This may occur when a single query causes search engine 120 to search both indexes.

Figure 2:
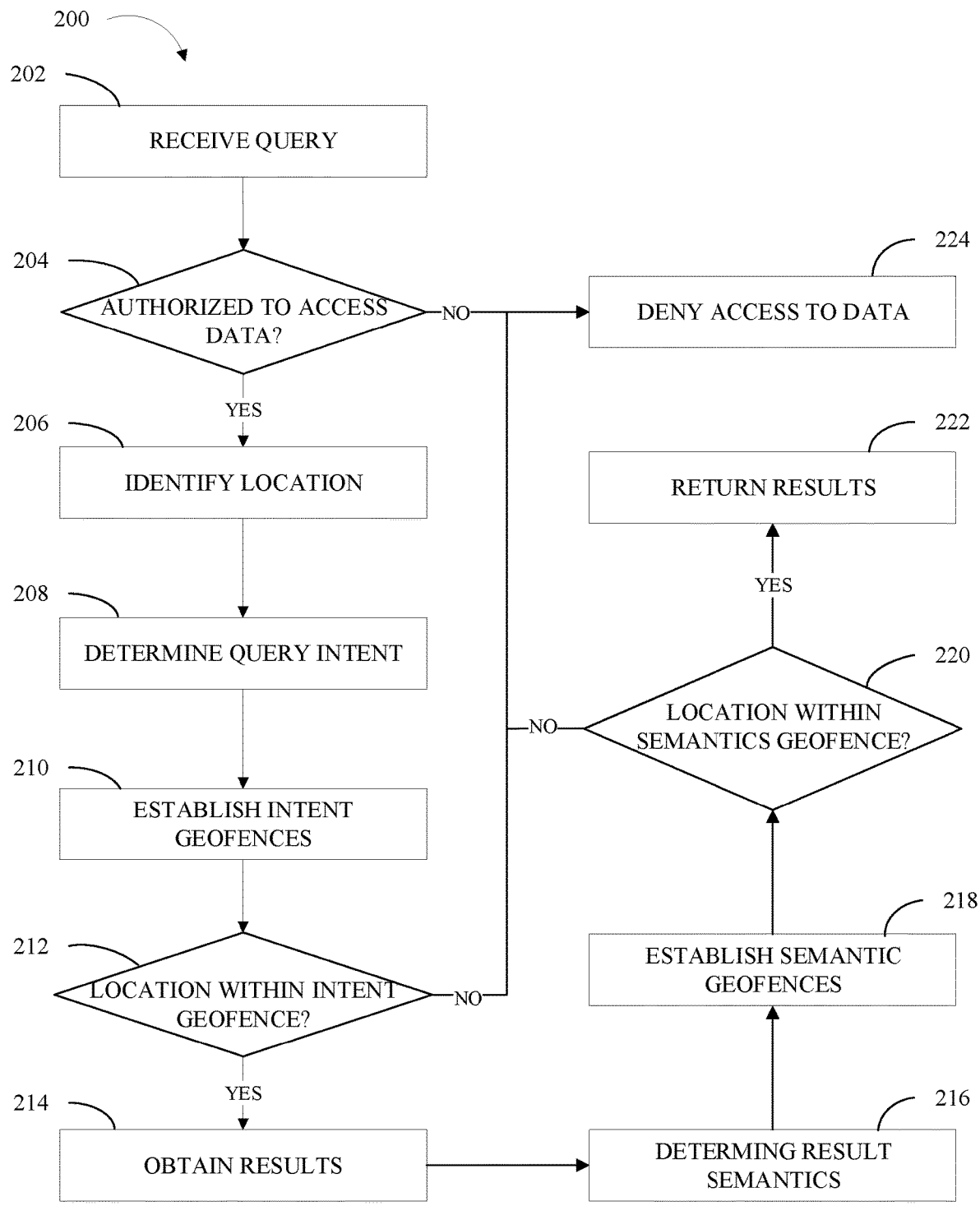
FIG. 2 illustrates a flow chart of an example method for geofencing queries based on query intent and result semantics, in accordance with some embodiments of the present disclosure.

FIG. 2 depicts a flowchart of an example method 200 for geofencing queries based on query intent and result semantics that can be performed in a computing environment (e.g., computing environment 100 and/or search service 110). One or more of the advantages and improvements described above for restricting access to data by geofencing results based on query intent and result semantics can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a search service (e.g., search service 110 of FIG. 1), a computing device, or a different combination of hardware and/or software. In various embodiments, the various operations of method 200 are performed by one or more of components or subcomponents described in FIG. 1.

At operation 202, search service 110 receives a query. In some embodiments, the query is received from client application 185 via network 190. In some embodiments, the query is received from a user. Each user may have a unique user identifier. The user may be identified as a person, a group (e.g., anyone in a particular department at a corporation), and/or a position (e.g., data analyst, etc.)

In some embodiments, the query is included in an API. The query may be received by API gateway 115 and then passed to search engine 120. In some embodiments, the query includes what data to search for (e.g., customer data, financial information, documents containing a particular word or phrase) and where to search (e.g., indexes 170). In some embodiments, the query includes location data of the user.

At operation 204, search service 110 determines if the user is authorized to access the data. In some embodiments, the authorization to access the data is based on permissions. The permissions may be set by a data owner. In some embodiments, the determination is made by authorization control 150. Authorization control 150 may check the user against permissions set by the data owner. Permissions may be stored and updated in access control data 155.

If it is determined the user has authorization to access the data (204:YES), then search service 110 proceeds to operation 206. If it is determined the user does not have authorization to access the data (204:NO), then search service 110 proceeds to operation 224.

At operation 206, search service 110 identifies a location of the user. In some embodiments, the location is the location of client application 185. The location may be identified by GPS, IP address, cellular networks, and/or any other method of determining location. In some embodiments, access to the data is denied in response to the query not including location data.

At operation 208, search service 110 determines the query intent. In some embodiments, query intent is determined by query intent detector 140 and/or query intent model 145. In some embodiments, the intent is determined by selecting one or more intents from a pre-defined set of intents. The determined intent may be based on the data the received query is seeking. The intent may be determined from the phrasing of the query, and/or by analyzing the data requested.

At operation 210, search service 110 establishes one or more intent geofences. An intent geofence is a geofence that is established in response to determining query intent. In some embodiments, the intent geofences are establishes by geofence initiator 125 and/or geofence configuration 130. In some embodiments, the intent geofences are selected from the geofences stored in geofence configuration 130.

In some embodiments, the geofences are established based on the search target (e.g., first index 170A). One geofence may be established for first index 170A, and a different index for second index 170B. In some embodiments, the intent geofences are established based on data owners. Within an index (e.g., first index 170A), different data may be subject to different intent geofence controls. In these embodiments, the intent geofence is established after the results of the query are found.

At operation 212, search service 110 determines if the location is within the intent geofences. The location is within a geofence when the location falls in the boundary defined by the geofence. Within the intent geofence may include areas that are inside a boundary or outside a boundary. For example, one geofence may allow access to the data if the query originates from a specific building, or the geofence may allow access if the query originates from outside the building. The locations may be compared against the geofences by geolocation detection 135.

In some embodiments, the location is within the intent geofences if the location is within all geofences. In some embodiments, the location is within the intent geofence if it is within any of the geofences.

If the location is within the intent geofences (212:YES), then search service 110 proceeds to operation 214. If the location is not within the intent geofences (212:NO), then search service 110 proceeds to operation 224.

At operation 214, search service 110 obtains the query results. In some embodiments, the results are obtained by search engine 120. In some embodiments, the results are obtained from one or more indexes.

At operation 216, search service 110 determines result semantics. In some embodiments, result semantics are determined by document semantic detection 160 and/or semantics model 165. In some embodiments, the result semantics are determined by selecting a semantic category from a predefined set of semantic categories. The categories can be based on entire documents or portions of documents. In some embodiments, a single document may be correlated to multiple semantic categories. For example, one category of result semantic may be customer data. All the results will be searched by the semantics learning model, and each document that includes customer data (e.g., name, phone, email, etc.) will be categorized under customer data result semantics.

At operation 218, search service 110 establishes semantic geofences. In some embodiments, operation 218 is consistent with operation 210, except it applies to semantic categories rather than query intent.

At operation 220, search service 110 determines if the location is within the semantic geofences. In some embodiments, operation 220 is consistent with operation 212, except it applies the location to the semantic geofences rather than the intent geofences.

If the location is within the semantic geofences (220: YES), then search service 110 proceeds to operation 222. If the location is not within the intent geofences (220:NO), then search service 110 proceeds to operation 224.

At operation 222, search service 110 returns the results. In some embodiments, the results are returned to client application 185. In some embodiments, the results are sent to API gateway 115, which configures and return the data to the requestor.

At operation 224, search service 110 denies access to the data. Denying access may include not returning the results. In some embodiments, operation 224 includes sending a notification to the requestor. The notification may indicate a reason for denial (e.g., search intent outside of allowed area). In some embodiments, denying access to the data includes sending a response that there is data within the parameters of the query, but not returning any data.

Figure 3:
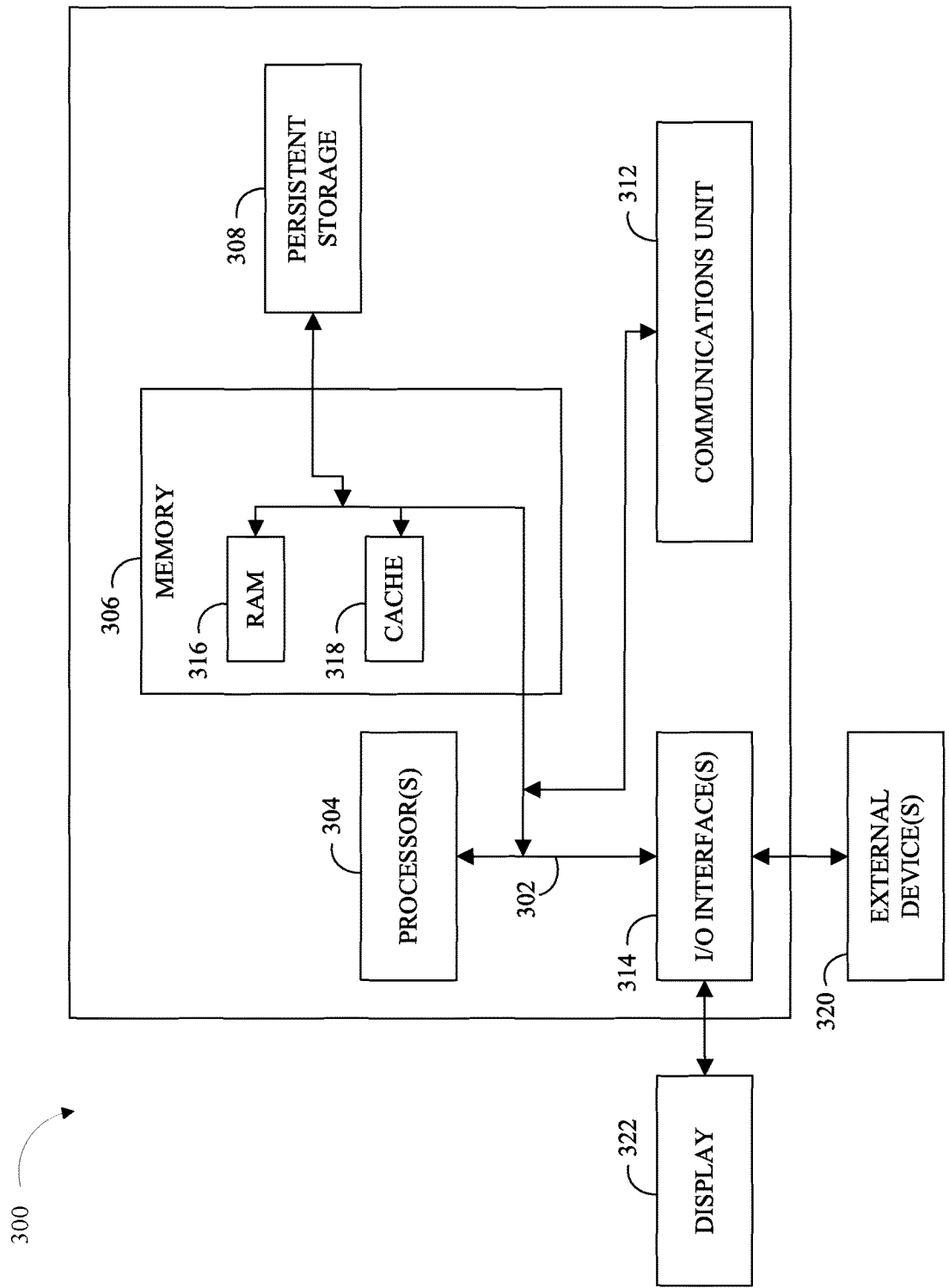
FIG. 3 illustrates a block diagram of an example computer system capable of operating a search service, in accordance with some embodiments of the present disclosure.

FIG. 3 is a block diagram depicting components of a computer 300 suitable for operation of search system 110 in accordance with at least one embodiment of the invention. In an embodiment, computer 300 is representative of search service 110. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for customized multicast program 101 and client program 102 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

Figure 4:
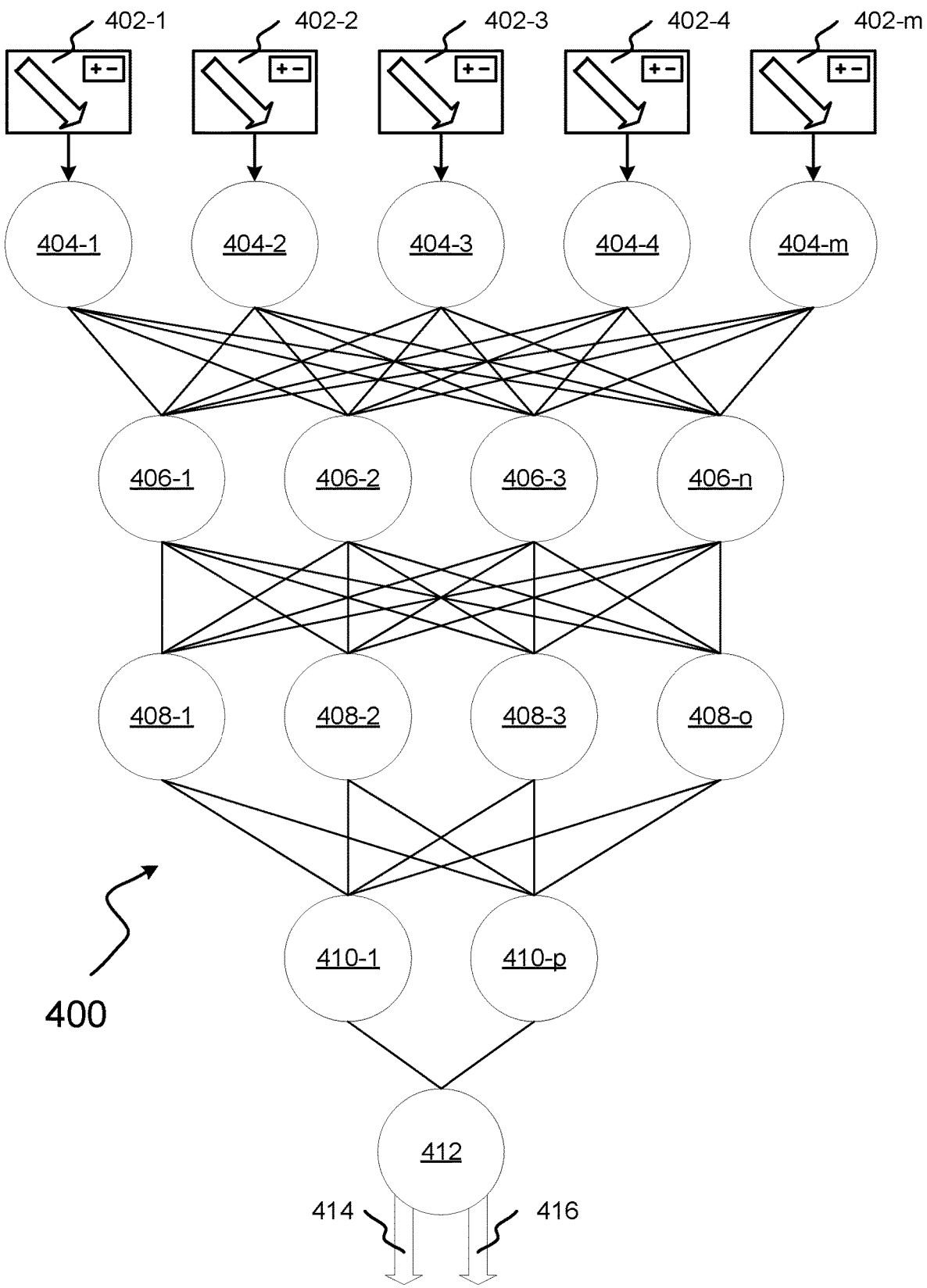
FIG. 4 depicts an example neural network that can be specialized to analyze historic data, in accordance with embodiments of the present disclosure.

FIG. 4 depicts an example neural network 400 that can be specialized to train one or more learning models that can be used to identify query intents and/or result semantics. For example, neural network 400 can be specialized to perform operations 208 and 216 of FIG. 2.

Neural network 400 can be a classifier-type neural network, or convolutional neural network. Neural network 400 can be part of a larger neural network. For example, neural network 400 can be nested within a single, larger neural network, connected to several other neural networks, or connected to several other neural networks as part of an overall aggregate neural network.

Inputs 402-1 through 402-$m$ represent the inputs to neural network 400. In this embodiment, inputs 402-1 through 402-$m$ do not necessarily represent different inputs. Rather, inputs 402-1 through 402-$m$ represent the same input that is sent to each first-layer neuron (neurons 404-1 through 404-$m$) in neural network 400. In some embodiments, the number of inputs 402-1 through 402-$m$ (i.e., the number represented by m) can equal (and thus be determined by) the number of first-layer neurons in the network. In other embodiments, neural network 400 can incorporate one or more bias neurons in the first layer, in which case the number of inputs 402-1 through 402-$m$ can equal the number of first-layer neurons in the network minus the number of first-layer bias neurons.

In some embodiments, a single input (e.g., input 402-1) can be input into the neural network. In such an embodiment, the first layer of neural network 400 can comprise a single neuron 402, which can propagate the input to the second layer of neurons. In some embodiments, the inputs 402-1 through 402-*m* are each a plurality of training documents configured to train search service 110 how to determine query intents and/or result semantics.

Inputs 402-1 through 402-*m* can comprise one or more values correlating to types of categories of intents and/or categories of result semantics. Neural network 400 comprises five layers of neurons (referred to as layers 404, 406, 408, 410, and 412, respectively corresponding to illustrated nodes 404-1 to 404-*m*, nodes 406-1 to 406-*n*, nodes 408-1 to 408-*o*, nodes 410-1 to 410-*p*, and node 412). In some embodiments, neural network 400 can have more than 5 layers or fewer than 5 layers. Each layer can comprise the same number of neurons as any other layer, more neurons than any other layer, fewer neurons than any other layer, or more neurons than some layers and fewer neurons than other layers.

In the embodiment illustrated in FIG. 4, layer 412 is treated as the output layer. Layer 412 can output a probability (e.g., likelihood a query has a certain intent). In the embodiment illustrated in FIG. 4, no bias neurons are shown in neural network 400. However, in some embodiments, each layer in neural network 400 can contain one or more bias neurons. Although layer 412 is shown having one output neuron (node 412), in other embodiments, layer 412 contains more than one output neuron.

Layers 404-412 can each comprise an activation function. The activation function utilized can be, for example, a rectified linear unit (ReLU) function, a SoftPlus function, a Soft step function, or others. Each layer can use the same activation function but can also transform the input or output of the layer independently of, or dependent upon, the ReLU function. This is also true in embodiments with more or fewer layers than are illustrated here.

Layer 412 is the output layer. In this embodiment, neuron 412 produces outputs 414 and 416. Outputs 414 and 416 represent complementary probabilities that a target event will or will not occur (or that a result is more likely linked to a specific intent). In some embodiments, outputs 414 and 416 represent the overall confidence score, and/or type confidence scores. In some embodiments, there is an output node for each type confidence score (e.g., each category of result semantics). In some embodiments, there is an output node for the overall confidence score. In some embodiments, outputs 414 and 416 can each be between 0.0 and 1.0 and can add up to 1.0. In such embodiments, a probability of 1.0 can represent a projected absolute certainty (e.g., if output 414 were 1.0, the projected chance that the target event would occur would be 100%, whereas if output 416 were 0.0, the projected chance that the target event would not occur would be 100%).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
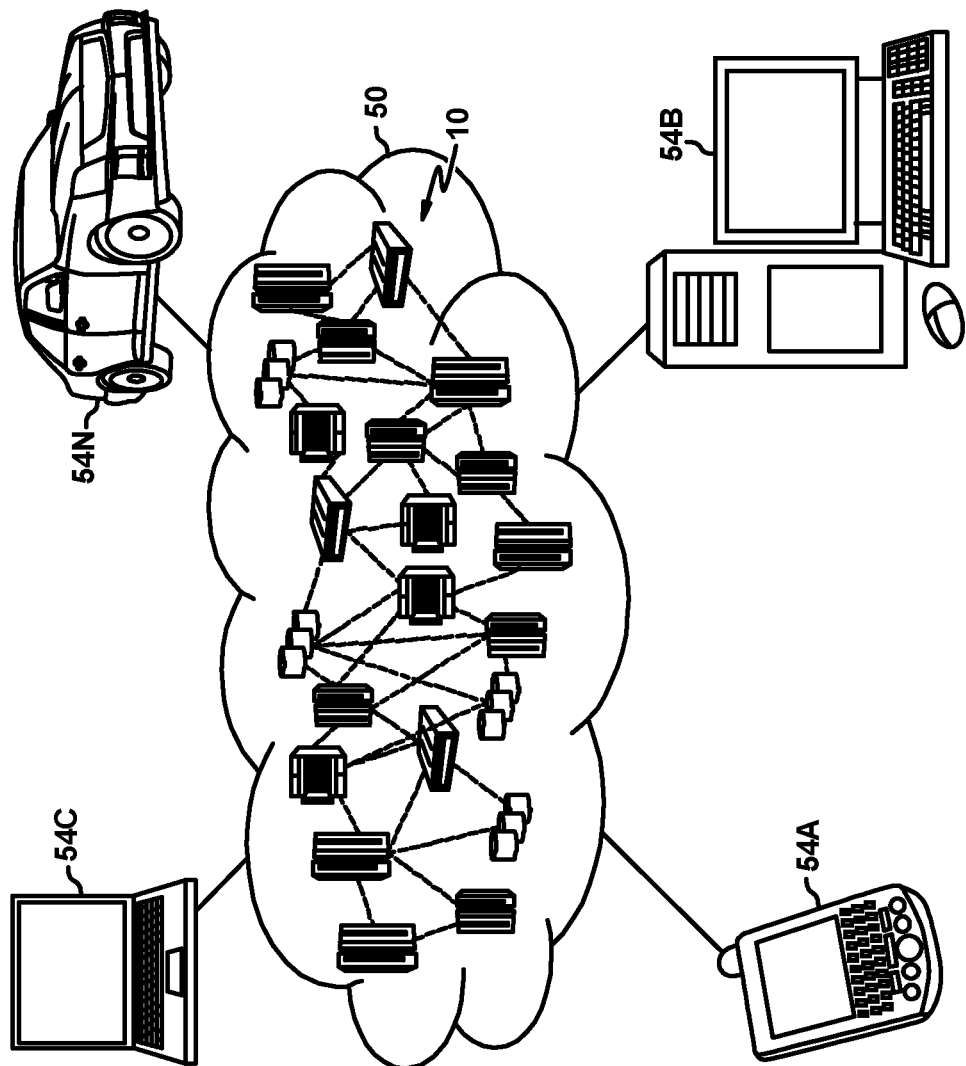
FIG. 5 depicts a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
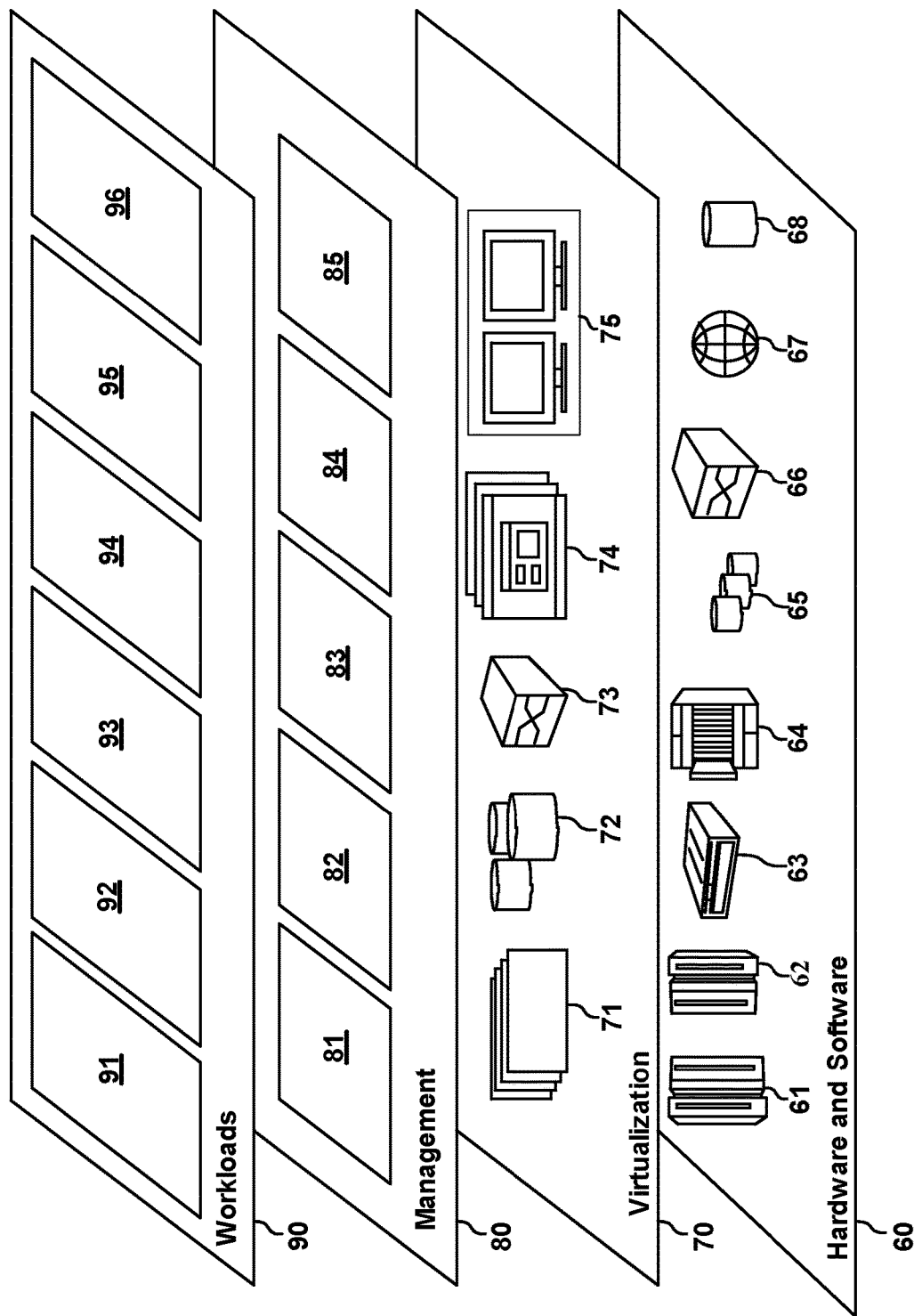
FIG. 6 depicts abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data access control.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a query from a location of a user, wherein the query is configured to identify a set of results stored in one or more indexes;
identifying the location of the user;
determining an intent of the query, wherein the intent predicts how the user will use the set of results;
establishing, in response to determining the intent and based on the intent, a first intent geofence, wherein the first intent geofence defines a first boundary for a first geographic area, the first intent geofence is configured to deny access to the set of data in response to the location being outside the first intent geofence, and the first geographic area is predefined by a data owner;
responsive to the query, obtaining the set of results from a first index of the one or more indexes, wherein data in the first index is owned by the data owner, and the set of results is associated with the first intent geofence;
determining a first semantic category for a first result of the set of results, wherein the first semantic category is based on specific language in a first portion of a first document of the set of results;
establishing, in response to determining the first semantic category, a first semantic geofence, wherein the first semantic geofence defines a second boundary for a second geographic region;
determining the location of the user is within the first intent geofence and the first semantic geofence; and
returning, in response to determining the location of the user is within the first intent geofence and within the first semantic geofence, the set of results to the user.

2. The method of claim 1, wherein the set of results comprises a second result obtained from a second index, the method further comprising:
determining a second semantic category, wherein the second semantic category is based on a second portion of the first document from the first result, and the first semantic category is based on a first portion of the first document;

establishing a second semantic geofence, wherein the first semantic geofence correlates to the first semantic category, and the second semantic geofence correlates to a second semantic category; and
determining the location is within the second semantic geofence.

3. The method of claim 1, wherein the determining of the intent includes selecting the intent from a predefined set of intents.

4. The method of claim 3, wherein the first geographic area is defined in response to the data owner outlining the first geographic area on a map.

5. The method of claim 1, wherein the first semantic category is selected from predefined set of semantic categories.

6. The method of claim 1, wherein the first intent is determined by an intent learning model.

7. The method of claim 6, further comprising:
training, using a set of training data, the intent learning model to identify the intent of the query.

8. The method of claim 1, wherein the semantic category for each of the plurality of results are determined by a semantic learning model.

9. The method of claim 1, wherein the method is performed by a search service, executing program instructions, and wherein the program instructions are downloaded from a remote data processing system.

10. A system comprising:
a processor; and
a computer-readable storage medium communicatively coupled to the processor and storing program instructions which, when executed by the processor, are configured to cause the processor to:
receive a query from a location of a user, wherein the query is configured to identify a set of results stored in one or more indexes;
identify the location of the user;
validate the user is authorized to access one or more indexes;
obtain a plurality of results from a first index, wherein data in the first index is owned by a data owner;
determine a semantic category for each of the plurality of results including a first semantic category for a first result;
establish, in response to determining the first semantic category of the first result, a first semantic geofence, wherein the semantic geofence defines a second boundary for a second geographic region, and the first semantic geofence is configured to deny access to the set of data in response to the location being outside the first semantic geofence, wherein the denial of access to the set of data includes not returning the set of data, and the second geographic area is predefined by the data owner;
determine an intent of the query, where the intent predicts how the user will use the plurality of results;
establish, in response to determining the intent, a first intent geofence, wherein the first intent geofence defines a first geographic area for a first geographic region;
determine the location is within the first semantic geofence and the first intent geofence; and
return, in response to determining the location is within the first semantic geofence and the first intent geofence, the plurality of results to the user.

11. The system of claim 10, wherein, the plurality of results comprises a second result obtained from a second index; the program instructions are further configured to cause the processor to:
establish a second semantic geofence, wherein the first semantic geofence correlates to a first category, and the second semantic geofence correlates to a second category; and
determine the location is within the second semantic geofence.

12. The system of claim 10, wherein the first semantic category is selected from predefined set of semantic categories.

13. The system of claim 10, wherein the intent is determined by an intent learning model.

14. A computer program product, the computer program product comprising a computer readable storage medium having program instructions embodied therewith, the program instructions executable by a processing unit to cause the processing unit to:
receive a query from a location of a user, wherein the query is configured to identify a set of results stored in one or more indexes;
identify the location;
obtain a plurality of results from a first index of the one or more indexes, wherein data in the first index is owned by a data owner;
determine a semantic category for each of the plurality of results including a first semantic category for a first result, wherein the first semantic category is based on specific language in a document of the set of results;
establish, in response to determining the first semantic category of the first result, a first semantic geofence, wherein the semantic geofence defines a second boundary for a second geographic region, and the first semantic geofence is configured to deny access to the set of data in response to the location being outside the first semantic geofence, and the second geographic area is predefined by the data owner;
determine the location is within the first semantic geofence;
determine an intent of the query, where the intent predicts how the user will use the plurality of results;
establish, in response to determining the intent, a first intent geofence, wherein the first intent geofence defines a first boundary for a first geographic region and the first intent geofence is configured to deny access to the set of data in response to the location being outside the first intent geofence, wherein the denial of access to the set of data includes notifying the user of the denial and a reason for denial;
determine the location is within the first intent geofence; and
return the plurality of results to the user.

15. The computer program product of claim 14, wherein, the plurality of results comprises a second result obtained from a second index, and the program instructions are further configured to:
establish a second semantic geofence, wherein the first semantic geofence correlates to a first category, and the second semantic geofence correlates to a second category; and
determine the location is within the second semantic geofence.

16. The computer program product of claim 15, wherein, the plurality of results are returned in response to determining the location is within the first intent geofence and determining the location is within the first semantic geofence.

17. The computer program product of claim 16, wherein the first semantic category is selected from predefined set of semantic categories and the intent selected from a predefined set of intents.

18. The method of claim 5, wherein the set of semantic categories comprises customer information, sensitive information, proprietary information, and confidential information.

19. The method of claim 2, further comprising:
   determining a third semantic category for the set of results, wherein the determining the third semantic category is based on a second portion of a first document from the first result, and the determining the first semantic category is based on a first portion of the first document;
   establishing a third semantic geofence for the third semantic category, wherein the returning the set of results to the user is further in response to determining the location is within the third semantic geofence.

20. The method of claim 3, wherein the set of intents comprises viewing data, manipulating data, transferring data, and aggregating data.

\* \* \* \* \*